Figure 1:
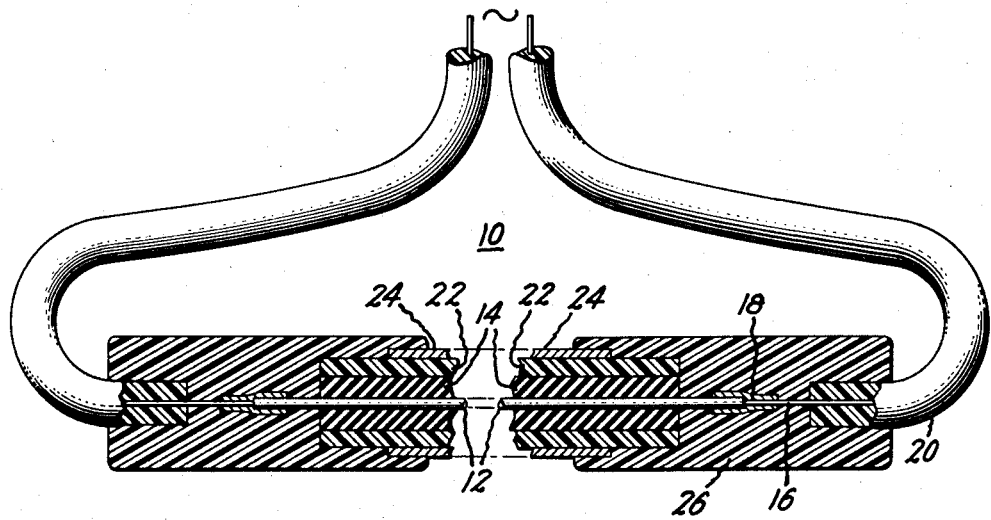

May 3, 1960

C. E. CHASE 2,935,719

HIGH TEMPERATURE SILICONE RUBBER HEATING CABLE

Filed Oct. 31, 1958

Inventor:
Carlton E. Chase,
by Francis K. Doyle
His Attorney.

2,935,719
Patented May 3, 1960

2,935,719
HIGH TEMPERATURE SILICONE RUBBER HEATING CABLE

Carlton E. Chase, Schenectady, N.Y., assignor to General Electric Company, a corporation of New York Application October 31, 1958, Serial No. 770,977

6 Claims. (Cl. 338—330)

This invention relates to a waterproof electrical connection for heating cable and more particularly to a waterproof electrical connection for connecting a heating cable and a lead wire.

The use of heating cable for refrigerator defrosters, for evaporators, for removing snow from roofs and many other applications, is well known. In many of the heating cables presently used today, due to the high temperature required of the wire in the heating cable, a silicone rubber insulation is necessary on the heater wire since silicone rubber is capable of withstanding extremely high temperatures without deterioration. However, the silicone rubber insulation is extremely expensive and the silicone rubber itself is very suceptible to damage from scraping or other means. Therefore, it has been necessary to provide the silicone rubber insulated heating cable with an outer covering of flexible metal braid in order to prevent damage to the silicone rubber insulation.

This expensive construction of the heating cable is necessary whenever high temperature electrical heating cables are required. However, when the heating cable is to be used in an application where it would be exposed to moisture, such as an automatic refrigerator defroster, this same expensive construction is generally carried out in making lead wire. That is the lead wire is usually provided with a silicone rubber insulation in order to provide an adequate waterproof connection between the silicone rubber heating wire and the silicone rubber lead wire. This has been necessary since, as is well known to those skilled in this art, the silicone rubber is incapable of bonding with other types of plastic or natural rubber insulation which might be utilized as insulation for the lead wire and in an overmold to seal the connection between the lead wire and the heating cable. For this reason it has been necessary to make both the heater wire insulation and the lead wire insulation of silicone rubber, and to use a silicone rubber overmold to provide the desired seal.

It has been proposed in other applications to provide a different type of lead wire wherein only a portion of the lead wire is provided with a silicone rubber insulation while the remainder of the lead wire may be provided with a natural rubber or other type of synthetic or plastic insulation coating. However, in order to provide the necessary waterproof bond between the silicone rubber and the rest of the lead wire elaborate steps, including the use of metal ferrules and extremely long cycle cooling and curing of silicone rubber overmolds are required in order to provide the waterproof connection. The curing of the silicone rubber must occur at extremely elevated temperatures, which is generally deleterious to natural rubber and other types of plastic or synthetic rubber coatings which might be used for insulation of the lead wire. Therefore, it has been necessary to thoroughly cure the silicone rubber portion of the heating cable and lead wire prior to the addition of the lead wire which is covered by natural rubber or other type of synthetic rubber insulation. Obviously, the long cycle curing as well as the necessity of adding other portions after the cooling cycle of the silicone rubber portions of the heating cable provides an expensive heating cable and also requires a long-cycle manufacturing time.

As used throughout this specification and claims, the term "plastic" is used in its broadest sense, to indicate either natural or synthetic rubber, other than silicone rubber and any material synthesized by chemical process to form an insulating material, such as those synthesized from a vinyl resin, or alkyd resins, and the like.

It is, therefore, an object of this invention to provide a heating cable which has a silicone rubber insulation thereon to thereby be able to withstand very high heating temperatures while at the same time providing a low cost waterproof electrical connection between the heating cable and a lead wire provided with plastic insulation.

It is a further object of this invention to provide a heating cable, which is capable of withstanding extremely high temperatures, and which has a low cost, waterproof electrical connection to the lead wire, which connection may be made in a very short period of time.

In carrying out this invention in one form a silicone rubber insulated heating cable, which is capable of withstanding extremely high temperatures, is provided with a plastic sleeve which completely covers the entire length of the heating cable. Lead wires are connected by any desired means to the wire of the heating cable and are provided with plastic insulation means. A plastic overmold is provided which is fused to the insulation of the lead wire as well as the sleeve which is provided on the heating cable to form a waterproof seal.

Figure 2:
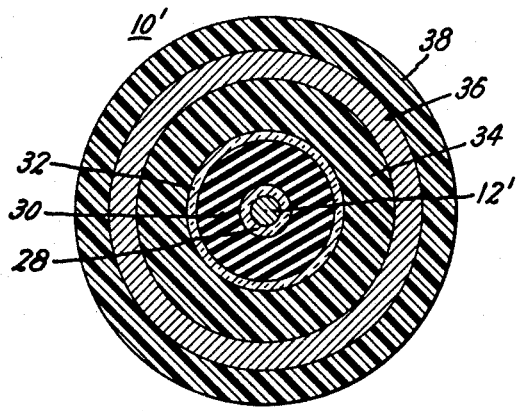

The details of this invention as well as the manner in which the above objects and advantages are obtained will be understood from the following description taken in connection with the accompanying drawings in which:

Figure 1 is a longitudinal view of a heating cable with lead wire, partially in section, showing one form of this invention; and Figure 2 is a sectional view of a portion of a heating cable showing another type of heating cable which may utilize the invention disclosed in this application.

Referring now to the drawings in which like numerals are used to indicate like parts throughout and in particular with reference to Figure 1, this invention is shown as applied to a heating cable 10 comprising a heater wire 12 which is provided with a silicone rubber insulation 14. Connected to the cable 10 is a lead wire 16, the wires 12 and 14 being connected by means of a conductor 18. The lead wire 16 is provided with a plastic insulation 20, which may be, for example, a vinyl plastic or other relatively inexpensive plastic insulation.

The electrical heating cable 10, provided with the silicone rubber insulation 14, has mounted over its entire length and completely surrounding the silicone rubber 14, a plastic sleeve 22, which preferably is the same type of plastic insulation as the insulation 20 provided on the lead wire. If desired, a flexible metal braid 24 may be provided over top of the plastic sleeve 22. In order to provide the desired waterproof connection between the lead wire 16 and its insulation 20 and the electrical heating cable 10 with its silicone rubber insulation 14, vinyl sleeve 22 and flexible metal braid 24, the following method is utilized:

The insulation 14, plastic sleeve 22, and metal braid 24 are removed from the heater wire 12 of heating cable 10 for an appropriate length. Similarly, the insulation 20 of the lead wire 16 is removed. These two wires are connected by connector 18, which may be a solderless or solder connector, as desired. Of course, it will be understood that the wires 12 and 16 could be connected together, as by soldering, without the use of any connector, if desired. The flexible metal braid 24 is stripped to expose a portion of the plastic layer or sleeve 22 which surrounds the silicone rubber insulation 14. The heater wire and lead wire connection is then placed between two or more plastic sheets which are preferably of the same type of plastic, for example, vinyl plastic, as is the plastic sleeve 22 and the plastic insulation 20. This build up of plastic sheets, surrounding the connection 18 and the plastic insulation 20 and the plastic sleeve 22, is then placed between the parts of a metal mold which are preferably attached to and heated by a heating machine. The mold is then closed and applies heat and pressure to the plastic sheeting and wire insulation for a very short period, for example, approximately 10 seconds where vinyl plastic is used. This action fuses the vinyl or other plastic sheeting forming the overmold 26. At the same time overmold 26 is fused to the vinyl or other plastic wire insulation 20 and sleeve 22 to thereby produce a waterproof seal between the heater wire and the lead wire. It is generally preferred that the plastic overmold 26 overlap the ends of the metal braid 24 to prevent the braid from fraying.

In this manner, inexpensive lead wires are utilized to provide the necessary current to the heating cable 10 and the connection between the heating cable and the lead wires can be provided with a waterproof connection which is very simple to form and can be done in a very short time. Of course, it will be understood that the other end of the heating cable will be provided with an inexpensive, quickly formed, waterproof connection in the same manner as set forth above. In those instances where the heater wire 12 and connector 18, which come in contact with the plastic overmold 26, are to be used at a temperature which exceeds the high temperature of the plastic used in the overmold 26, then a heat insulator, such as glass insulation, will be provided between the heater wire and connector and the plastic overmold.

Figure 2 is a section of a heating cable 10' which may also be used with an inexpensive lead wire such as 16 and be provided with a waterproof seal between the lead wire and the heating cable in the manner as set forth above. In some applications the heater wire of a heating cable will be subjected to temperatures which are higher than those which the plastic sleeve could withstand. In such instances the heating wire and cable can be provided with glass separators or glass insulation to prevent the high heat of the heater wire from deteriorating the plastic sleeve on the heating cable. As shown in Figure 2, the heating cable 10' is composed of a heater wire 12' which is surrounded by glass insulation 28, the glass insulation 28 in turn being surrounded by a silicone rubber layer 30. A second glass insulation is provided, indicated as number 32, which surrounds the silicone rubber insulation 30. Surrounding the glass insulation 32 would be the plastic sleeve 34, such as for example, vinyl plastic, and on top of the vinyl plastic sleeve if desired could be placed a metal braid 36. In the same manner as set forth above, the heating cable would be stripped to the wire 12' and the connection would be made between the heater wire and the lead wire by means of a solder or solderless connector, then the plastic waterproof seal, indicated as 38, would be provided, fusing securely to the plastic sleeve on the heater cable and to the plastic insulation on the lead wire.

While there has been described the best mode presently used to carry out this invention, it will be understood that various changes and modifications may be made without departing from the spirit and scope of this invention as defined in the appended claims.

What is claimed as new and which is desired to be secured by Letters Patent of the United States is:

1. A heating cable adapted for use in installations where moisture is present comprising a heater wire, silicone rubber insulation surrounding said heater wire but not covering the ends thereof, a plastic insulated sleeve surrounding said silicone rubber insulation, a pair of lead wires, plastic insulation surrounding said lead wires but not covering the ends thereof, a connector joining one end of each lead wire to one of the ends of said heater wire, and a plastic overmold completely surrounding said connector and being fused to said plastic sleeve and to said plastic insulation to thereby form a waterproof connection between said heating cable and said lead wires.

2. A method of forming a waterproof connection between a heating cable having a silicone rubber insulation and a lead wire having a plastic insulation which comprises first placing a plastic sleeve over the entire length of the heating cable, completely surrounding the silicone rubber insulation, connecting the heater wire of the heating cable to the lead wire, placing said connection between plastic sheets so that the plastic sheets overlay the plastic sleeve and the plastic insulation, inserting the plastic covered connection in a mold, closing said mold and applying heat and pressure until said plastic sheets are fused together and to said sleeve and said insulation.

3. An electric heating cable provided with a waterproof joint between the heating cable and lead wire comprising a heater wire provided with a silicone rubber insulation, the ends of said heater wire being free of such insulation, a plastic insulation surrounding said silicone rubber insulation, a pair of lead wires surrounded by a plastic insulation but not covering the ends thereof, means joining one end of each lead wire to one of the ends of said heater wire, and a plastic overmold completely surrounding said joining means and being fused to said plastic insulation on said heater wire and on said lead wires, whereby said heating cable and said lead wires are provided with a waterproof connection.

4. A waterproof connection for a heating cable having a silicone rubber insulation comprising, a plastic insulation surrounding the silicone rubber insulation of the heating cable, a pair of lead wires provided with plastic insulation means joining one end of each lead wire to one of the ends of the heater wire of said cable, and a plastic overmold completely surrounding said joining means and being fused to said plastic insulation on said cable and to said plastic insulation on said lead wires to maintain said connection waterproof.

5. A heating cable adapted for use in installations subject to moisture, having an inexpensive, quickly formed, waterproof connection which comprises, a heater wire having a silicone rubber insulation, a plastic insulated sleeve surrounded with silicone rubber insulation, a flexible metal braid surrounding said plastic insulated sleeve, a pair of lead wires being provided with plastic insulation, a connector joining one end of each lead wire to one of the ends of said heater wire and a plastic overmold completely surrounding said connector and being fused to said plastic sleeve and said plastic insulation and over-lying said flexible metal braid whereby a waterproof connection is formed between said heater wire and said lead wires.

6. A method of forming a waterproof connection between a heating cable having a silicone rubber insulation and a lead wire having a plastic insulation which comprises the steps of first, placing a plastic sleeve over the entire length of the heating cable completely surrounding the silicone rubber insulation, stripping a portion of said plastic sleeve and said silicone rubber insulation from one end of the heater wire of said heating cable, stripping the plastic insulation from one end of the lead wire, connecting the stripped end of said heater wire and said lead wire, placing said connection between plastic sheets so that the plastic sheets overlay the plastic sleeve and the plastic insulation, applying heat and pressure to said plastic covered connection until said plastic sheets are fused to each other and to said plastic sleeve and said plastic insulation.

References Cited in the file of this patent

UNITED STATES PATENTS

| | | |
|---|---|---|
| 2,460,795 | Warrick | Feb. 1, 1949 |
| 2,610,286 | Cox | Sept. 9, 1952 |
| 2,659,795 | Boggs | Nov. 17, 1953 |
| 2,800,560 | Schrotter et al. | July 23, 1957 |